US010591002B2

(12) United States Patent
Cultraro

(10) Patent No.: US 10,591,002 B2
(45) Date of Patent: Mar. 17, 2020

(54) ROTARY DAMPER WITH UNIDIRECTIONAL COUPLING

(71) Applicant: CULTRARO AUTOMAZIONE ENGINEERING S.R.L., Rivoli (Turin) (IT)

(72) Inventor: Paolo Cultraro, Rivoli (IT)

(73) Assignee: CULTRARO AUTOMAZIONE ENGINEERING S.R.L., Rivoli (Turin) (IT)

( * ) Notice: Subject to any disclaimer, the term of this patent is extended or adjusted under 35 U.S.C. 154(b) by 238 days.

(21) Appl. No.: 15/546,652

(22) PCT Filed: Jan. 29, 2016

(86) PCT No.: PCT/IB2016/050454
§ 371 (c)(1),
(2) Date: Jul. 26, 2017

(87) PCT Pub. No.: WO2016/120835
PCT Pub. Date: Aug. 4, 2016

(65) Prior Publication Data
US 2018/0017113 A1 Jan. 18, 2018

(30) Foreign Application Priority Data

Jan. 29, 2015 (IT) .............................. TO2015A0067

(51) Int. Cl.
*F16D 59/00* (2006.01)
*F16F 7/06* (2006.01)
(Continued)

(52) U.S. Cl.
CPC ................ *F16D 59/00* (2013.01); *F16F 7/06* (2013.01); *F16F 9/12* (2013.01); *E05F 5/02* (2013.01);
(Continued)

(58) Field of Classification Search
CPC .. F16D 59/00; F16D 2121/14; F16D 2125/48; F16D 2127/004; F16D 41/069;
(Continued)

(56) References Cited

U.S. PATENT DOCUMENTS 1,045,010 A 2/1913 Matthews
1,338,556 A 4/1920 Craig
(Continued)

FOREIGN PATENT DOCUMENTS

EP 2003364 B1 4/2012
FR 449089 2/1913
(Continued)

OTHER PUBLICATIONS

European Patent Office; International Search Report for counterpart International Application No. PCT/IB2016/050454, 5 pages (dated Jun. 9, 2016).
(Continued)

*Primary Examiner* — Huan Le
(74) *Attorney, Agent, or Firm* — Womble Bond Dickinson (US) LLP

(57) ABSTRACT

Rotary damper (15), comprising a casing (17), an intermediate element (31) mounted movably on the casing (17), a braking fluid provided between the casing (17) and the intermediate element (31) so as to brake the movement of the intermediate element (31) relative to the casing (17), a rotor (50) mounted on the intermediate element (31) rotatably about an axis of rotation (x), and a unidirectional coupling arranged between the intermediate element (31) and the rotor (50). The unidirectional coupling comprises at least one radial block (60) arranged between a radially outer surface (52) of the rotor (50) and a radially inner surface (34) of the intermediate element (31), and at least one actuating lobe (55) formed on the rotor (50) and projecting radially
(Continued)

Figure 1:
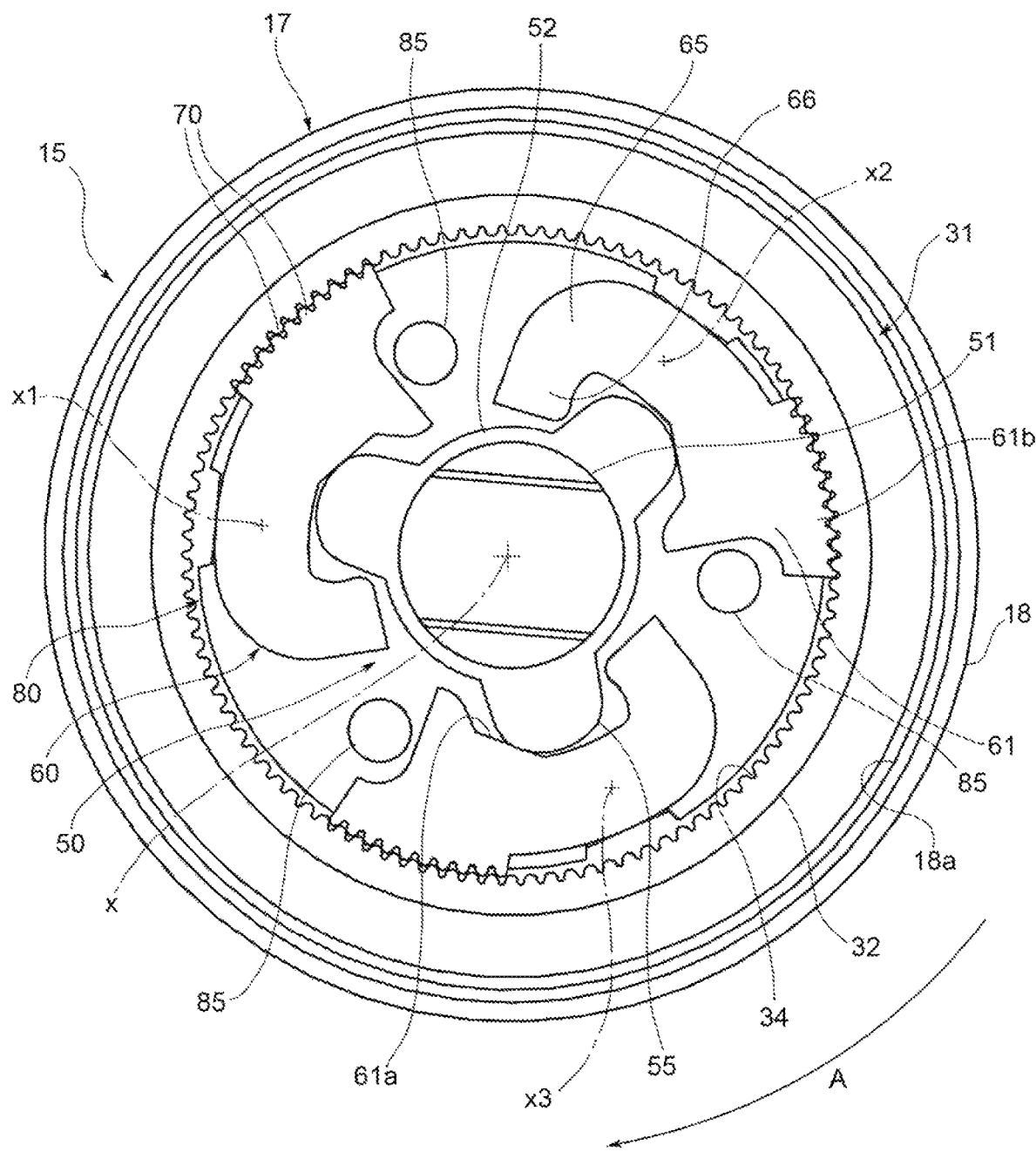

from the radially outer surface (52) thereof, the radial bock (60) comprising a wedge part (61) designed to be engaged by the actuating lobe (55) of the rotor (50) during rotation in the first direction of rotation (A) so as to push the radial block (60) in the centrifugal direction and lock it between the rotor (50) and the intermediate element (31).

8 Claims, 3 Drawing Sheets

(51) Int. Cl.
*F16F 9/12* (2006.01)
*E05F 5/02* (2006.01)
*F16D 57/00* (2006.01)
*F16D 121/14* (2012.01)
*F16D 125/48* (2012.01)
*F16D 127/00* (2012.01)

(52) U.S. Cl.
CPC ..... *E05Y 2201/21* (2013.01); *E05Y 2201/234* (2013.01); *E05Y 2201/252* (2013.01); *E05Y 2900/132* (2013.01); *E05Y 2900/20* (2013.01); *F16D 57/00* (2013.01); *F16D 2121/14* (2013.01); *F16D 2125/48* (2013.01); *F16D 2127/004* (2013.01); *F16D 2200/0034* (2013.01)

(58) Field of Classification Search
CPC ..... F16D 41/07; F16F 7/06; F16F 9/12; E05F 5/02
See application file for complete search history.

(56) References Cited

U.S. PATENT DOCUMENTS

| | | |
|---|---|---|
| 4,921,231 A | 5/1990 | Reynolds et al. |
| 6,189,666 B1 | 2/2001 | Willmot |
| 2007/0108000 A1 | 5/2007 | Derr et al. |
| 2014/0083809 A1 | 3/2014 | Shimozaki et al. |

FOREIGN PATENT DOCUMENTS

| | | |
|---|---|---|
| FR | 34198 E | 11/1928 |
| FR | 743996 A | 4/1933 |
| WO | WO 2008/083417 A1 | 7/2008 |

OTHER PUBLICATIONS

European Patent Office; Written Opinion for counterpart International Application No. PCT/IB2016/050454, 5 pages (dated Jun. 9, 2016).

ROTARY DAMPER WITH UNIDIRECTIONAL COUPLING

CROSS-REFERENCE TO RELATED APPLICATIONS

This patent application is a U.S. National Phase application under 35 U.S.C. § 371 of International Application No, PCT/IB2016/050454, filed Jan. 29, 2016, entitled ROTARY DAMPER WITH UNIDIRECTIONAL COUPLING, which claims priority from Italian Patent Application No. TO2015A000067, filed Jan. 29, 2015.

The present invention relates to a rotary damper, comprising:
a casing,
an intermediate element mounted movably on the casing,
braking means arranged between the casing and the intermediate element so as to brake the movement of the intermediate element relative to the casing,
a rotor mounted on the intermediate element rotatably about an axis of rotation, and
a unidirectional coupling arranged between the intermediate element and the rotor, said unidirectional coupling being designed to couple rigidly the rotor together with the intermediate element in a first direction of rotation of the rotor relative to the casing and uncouple the rotor from the intermediate element in a second direction of rotation of the rotor relative to the casing, opposite to the first direction.

A device of this type is described for example in the publication EP 2 003 364. In this known damper the unidirectional coupling comprises one or more recesses formed in the radially outer surface of the rotor, and corresponding rolling components arranged inside the recesses and positioned between the radially outer surface of the rotor and the radially inner surface of the intermediate element.

For reliable operation, when relatively high working torques are present, at least the rolling components must be made of metal, while the other components are generally made of plastic. The metal parts represent a significant portion of the final cost of the product, both owing to the higher cost of the material and because of the machining costs.

One object of the present invention is therefore to propose a rotary damper of the unidirectional type which may be made entirely of plastic without significant negative effects on the performance of the device.

The invention therefore-relates to a rotary damper of the type defined initially, wherein the unidirectional coupling comprises at least one radial block arranged between a radially outer surface of the rotor and a radially inner surface of the intermediate element, and an actuating lobe formed on the rotor and projecting radially from the radially outer surface thereof, the radial block comprising a wedge part designed to be engaged by the actuating lobe of the rotor during rotation in the first direction of rotation so as to push the radial block in a centrifugal direction and lock it between the rotor and the intermediate element, and further comprising a support disk mounted on the intermediate element coaxially with the axis of rotation, the radial block being pivotably mounted on the support disk about a pivoting axis parallel to said axis of rotation.

In such a device the radial blocks may be made of plastic because the forces transmitted by them between the rotor and the intermediate element during locking are spread over a wide area and not concentrated in one point, as instead was the case with the spherical or cylindrical shaped rolling components used in the known damper.

According to a preferred embodiment of the invention, the rotary damper further comprises a support disk mounted on the intermediate element rotatably about the axis of rotation, the radial block being pivotably mounted on the support disk about a pivoting axis parallel to said axis of rotation. The presence of the support disk is particularly preferred in that it results in more reliable operation of the damper, in particular during the transition from the coupled configuration to the uncoupled configuration. In the case where the radial blocks are housed freely inside the chamber of the intermediate rotor, it has in fact been established that, in the case where dirt or oil penetrates inside the chamber of the intermediate rotor, it is possible that this may create minimum adhesion between the radial block and the bottom of the chamber of the intermediate rotor, which adhesion, however, may be sufficient to cause slight imprecision during the transition from the coupled configuration to the uncoupled configuration. Instead, with pivotable mounting on the support disk, the radial block is forced to rotate, relative to the support disk, about its pivoting axis, resulting in a more precise movement of the components, less affected by the problems associated with dirt.

Moreover, the support disk facilitates the assembly of the device since it may be mounted on the intermediate element with the radial blocks already mounted on it. Otherwise, the radial blocks must be positioned singly inside the intermediate element, which may result in a certain degree of complication when these have very small dimensions.

Other preferred embodiments of the invention are defined in the dependent claims which are to be understood as forming an integral part of the present description.

Figure 2:
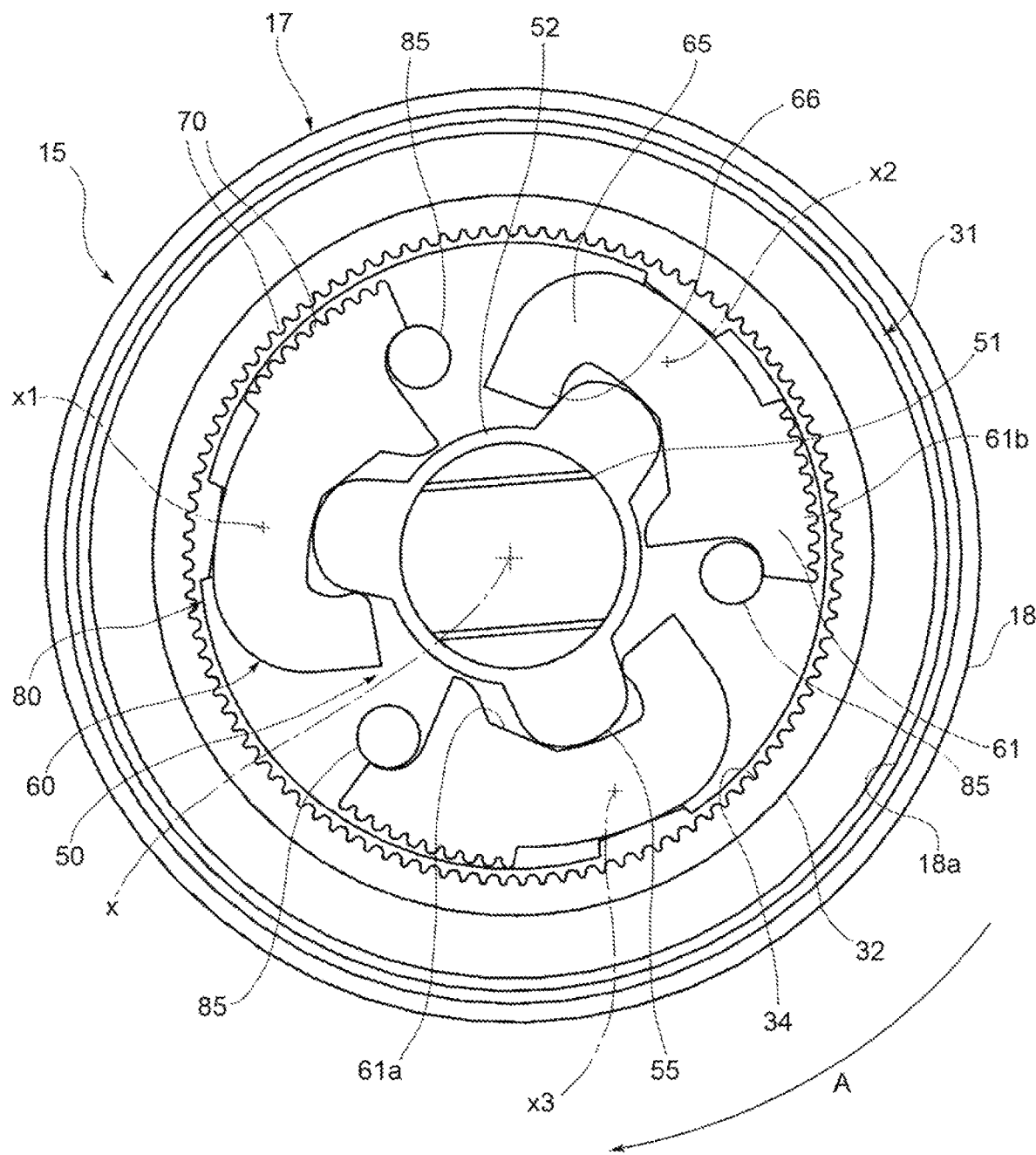
Figure 3:
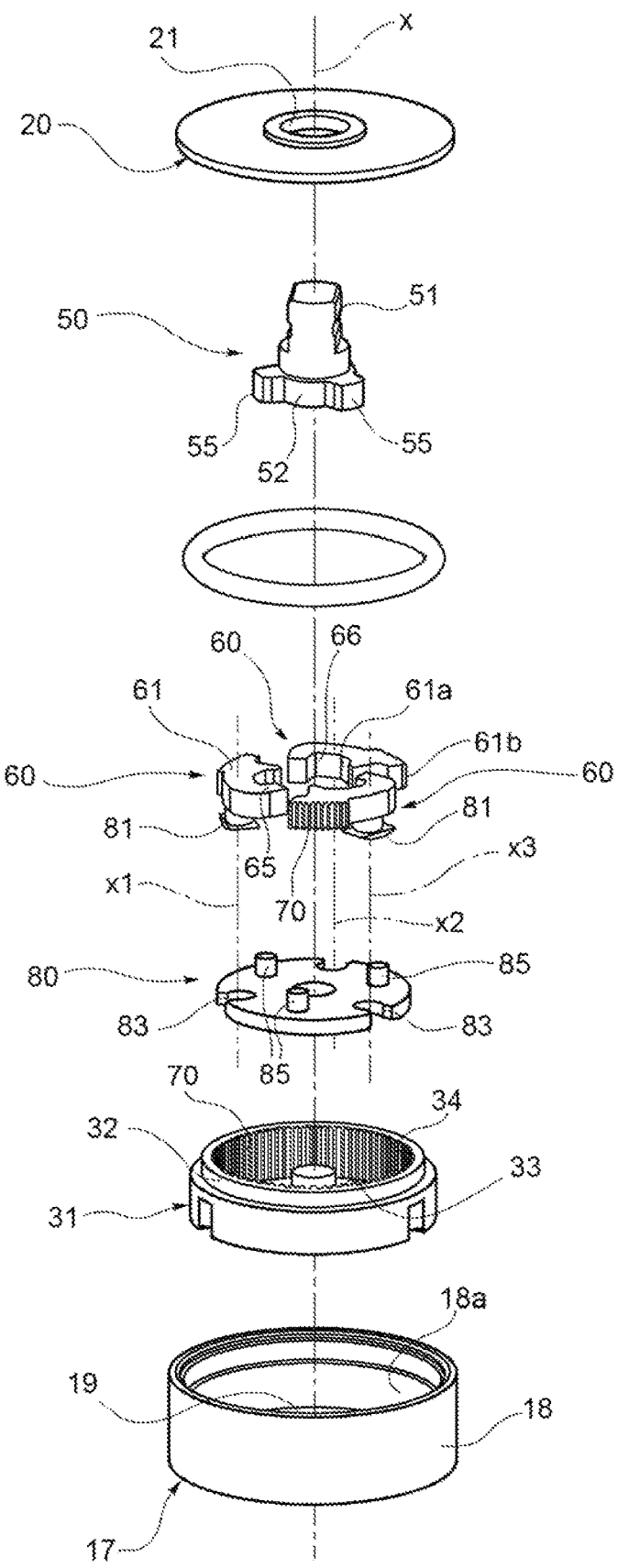

Further characteristic features and advantages of the rotary damper according to the invention, will become clear from the following detailed description of an embodiment of the invention, with reference to the accompanying drawings, which are provided purely by way of a non-limiting example and in which:

FIGS. 1 and 2 are plan views which illustrate operation of a damper according to the invention; and FIG. 3 is an exploded view of the damper shown in FIGS. 1 and 2.

With reference to the figures, the reference number 15 denotes overall a rotary damper of the unidirectional type. This device may be associated with a movable member, such as a hinged cover or door (not shown).

The device 15 comprises essentially a casing 17. The casing 17 has a wall 18 which encloses internally a substantially cylindrical chamber 19 which is open at one end and bounded laterally by the inner surface 18a of the wall 18. The casing 17 may be provided with fixing means (not shown) for fastening the damper 15 to another component (not shown).

The cylindrical chamber 19 is designed to be closed by a cover 20 mounted in a conventional manner on the casing 17 and having a central hole 21.

The device 15 further comprises an intermediate element 31 mounted on the casing 17 rotatably about an axis of rotation x. In the embodiment shown, the intermediate element 31 is a circular cup-shaped element which has a side wall 32 and a bottom wall 33 which together define a cavity open at one end. The side wall 32 of the intermediate element 31 has a radially inner surface 34 which surrounds this cavity. More generally, the intermediate element 31 and the casing 17 may have forms different from that shown. Moreover, the intermediate element 31 and the casing 17 may be coupled together in a manner different from that shown, so as to provide relative movement configurations different from a purely rotational configuration, described here. For example, the intermediate element 31 may be coupled with the casing 17 so as to provide a screw-type movement. It is however essential that the relative movement of intermediate element 31 and casing 17 envisaged should have at least a rotational component about the axis x.

The chamber 19 contains a highly viscous fluid of the known type, for example silicone oil, so that the intermediate element 31 is slowed down during its rotational movement by the friction with the viscous fluid. The presence of the braking fluid is also not essential for the purposes of the invention, and the invention is applicable with other braking means of the type known in the sector, provided that functionally they are arranged between the casing 17 and the intermediate element 31.

The device 15 furthermore comprises a rotor 50 mounted on the intermediate element 31 rotatably about the axis of rotation x. The rotor 50 is partially seated inside the cavity formed in the intermediate element 31 and has one end 51 which projects outwards through the central hole 21 of the cover 20. This end 51 of the rotor 50 is configured to provide a dynamic connection between the rotor 50 and a component (not shown) outside of the damper, for example via a gear wheel (not shown) keyed onto the end 51 of the rotor. The rotor 50 has a radially outer surface 52 situated opposite the radially inner surface 34 of the intermediate element 31. The rotor 50 has at least one actuating lobe 55 (in the example shown, three lobes) designed to control a unidirectional coupling, as described further below. The actuating lobe 55 is formed integrally with the rotor 50 and projects radially from the radially outer surface 52 of the rotor 50.

A unidirectional coupling is arranged between the intermediate element 31 and the rotor 50, said coupling being designed to couple rigidly the rotor 50 together with the intermediate element 31 in a first direction of rotation A of the rotor 50 relative to the casing 17 (see FIG. 1) and uncouple the rotor 50 from the intermediate element 31 in a second direction of rotation B of the rotor 50 relative to the casing 17, opposite to the first direction (see FIG. 2). Therefore, in the first direction of rotation the rotational movement of the rotor 50 rigidly locked together with the intermediate element 31 is braked by the braking means arranged between the intermediate element 31 and the casing 17, while in the second direction of rotation the rotor 50 rotates freely relative to the intermediate element 31 which is in fact practically rigidly locked together with the casing 17 owing to the presence of the braking means between the intermediate element 31 and the casing 17.

The unidirectional coupling comprises at least one radial block 60 (in the example shown, three blocks) arranged between the radially outer surface 52 of the rotor 50 and the radially inner surface 34 of the intermediate element 31, and a corresponding actuating lobe 55 designed to cause the movement of the radial block 60.

The radial block 60 comprises a wedge part 61 and a driving part 65 arranged adjacent to each other in the circumferential direction.

The wedge part 61 of the block 60 is designed to be engaged by the actuating lobe 55 of the rotor 50 during rotation in the first direction of rotation A so as to push centrifugally the wedge part of the radial block 60 (in particular, causing the latter to rotate about a respective pivoting axis, as will be clarified below) and locking it between the rotor 50 and the intermediate element 31.

The wedge part 61 of the radial block 60 comprises a radially inner ramp-like surface 61a designed to be engaged by the actuating lobe 55 of the rotor 50, and a radially outer surface 61b designed to engage with the radially inner surface 34 of the intermediate element 31. The radially outer surface 61b of the wedge part 61 of the radial block 60 and/or the radially inner surface 34 of the intermediate element 31 have formations 70, for example teeth, for increasing the twisting moment which can be transmitted between them.

The driving part 65 is designed to be engaged by the actuating lobe 55 of the rotor 50 during rotation in the second direction of rotation B so as to keep the radial block 60 positioned separated from the radially inner surface 34 of the intermediate element 31. For this purpose, the driving part 65 of the radial block 60 has an engaging end 66 extending in the centripetal direction and designed to be engaged by the actuating lobe 55 of the rotor 50.

The radial blocks 60 are pivotably mounted on a support disk 80 which is in turn mounted on the intermediate element 31 coaxially with the axis of rotation x. In particular, the support disk 80 may be mounted so as to be movable rotationally about the axis x relative to the intermediate element 31. The support disk 80 is seated inside the cavity formed in the intermediate element 31, between the bottom of the cavity of the intermediate element 31 and the rotor/block assembly. In the example shown each radial block 60 has a pin 81 extending axially towards the support disk 80 and inserted in a corresponding opening 83 formed in the support disk; in order to prevent the pin 81 from coming out of or moving from the seat the respective opening 83 may be provided with features conventional per se, such as locking teeth, retaining projections, etc. Each radial block 60 is therefore pivotably mounted on the support disk 80 about a respective pivoting axis x1, x2, x3 parallel to the axis of rotation x of the rotor.

The pin 81 is formed in the region of the driving part 65 of the respective radial block 60 opposite to the wedge part 61. The pin 81 is situated in an intermediate position between the engaging end 66 and the wedge part 61. Consequently, each radial block 60 is able to oscillate in the manner of a rocker arm.

The support disk 80 further comprises at least one stop pin 85 (one for each radial block 60) formed projecting axially from the support disk 80. The stop pin 85 can be engaged by the wedge part 61 of the radial block 60 when the latter rotates in the centripetal direction (namely during the movement from the coupled configuration to the uncoupled configuration).

When the device 15 is in the coupled configuration shown in FIG. 1 and the rotor 50 is rotated in the second direction of rotation B, the actuating lobe 55 moves from the radially inner surface 61a of the wedge part 61 of the radial block 60 towards the engaging end 66; by engaging with this end 66 of the block 60, the actuating lobe 55 causes the wedge part 61 of the block 60 to rotate about the respective pivoting axis in the centripetal direction and then be retained in this position spaced from the radially inner surface 34 of the intermediate element 31.

When the device 15 is in the uncoupled configuration shown in FIG. 2 and the rotor 50 is rotated in the first direction of rotation A, the actuating lobe 55 moves from the engaging end 66 towards the radially inner ramp-like surface 61a of the wedge part 61 of the radial lock 60, until the thickness of the wedge part 61 is such that an interference is created between the actuating lobe 55 and the radially inner surface 61a of the block, and between the radially outer surface 61b of the blocks and the radially inner surface 34 of the intermediate element 31.

The radial body 60 may be configured in a manner different from that described above and illustrated in the figures. In particular, the driving part of the block as described above may be differently shaped or the connection between block and support disk may be realized in a different way.

What is claimed is:

1. Rotary damper comprising:
   a casing,
   an intermediate element mounted movably on the casing,
   a braking fluid arranged between the casing and the intermediate element so as to brake the movement of the intermediate element relative to the casing,
   a rotor mounted on the intermediate element rotatably about an axis of rotation, and
   a unidirectional coupling arranged between the intermediate element and the rotor, said unidirectional coupling being designed to couple rigidly the rotor together with the intermediate element in a first direction of rotation of the rotor relative to the casing and uncouple the rotor from the intermediate element in a second direction of rotation of the rotor relative to the casing, opposite to the first direction,
   wherein the unidirectional coupling comprises at least one radial block arranged between a radially outer surface of the rotor and a radially inner surface of the intermediate element, and at least one actuating lobe formed on the rotor and projecting radially from the radially outer surface thereof, the radial block comprising a wedge part designed to be engaged by the actuating lobe of the rotor during rotation in the first direction of rotation so as to push the radial block in a centrifugal direction and lock it between the rotor and the intermediate element, wherein the rotary damper further comprises a support disk mounted on the intermediate element coaxially with the axis of rotation, the radial block being pivotably mounted on the support disk about a pivoting axis parallel to said axis of rotation.

2. The damper according to claim 1, wherein the radial block is pivotably mounted on the support disk on a part thereof situated opposite the wedge part.

3. The damper according to claim 2, wherein the support disk further comprises at least one stop pin formed projecting axially from the support disk, said stop pin being engageable by the wedge part of the radial block when the latter rotates in a centripetal direction.

4. The damper according to claim 1, wherein the intermediate element is mounted on the casing so as to perform a relative movement with at least one rotational component about said axis of rotation.

5. The damper according to claim 1, wherein the wedge part of the radial block comprises a radially inner ramp-like surface designed to be engaged by the actuating lobe of the rotor, and a radially outer surface designed to engage with the radially inner surface of the intermediate element.

6. The damper according to claim 5, wherein the radially outer surface of the wedge part of the radial block and/or the radially inner surface of the intermediate element have formations for increasing a twisting moment which can be transmitted between them.

7. The damper according to claim 1, wherein the radial block further comprises a driving part designed to be engaged by the actuating lobe of the rotor during rotation in the second direction of rotation so as to keep the radial block positioned separate from the radially inner surface of the intermediate element.

8. The damper according to claim 7, wherein the driving part of the radial block has an engaging end extending in a centripetal direction and designed to be engaged by the actuating lobe of the rotor.

* * * * *